April 18, 1933.                W. L. CLOUSE                1,904,412
                              LUBRICANT COOLER
                    Filed Nov. 10, 1930         2 Sheets-Sheet 2
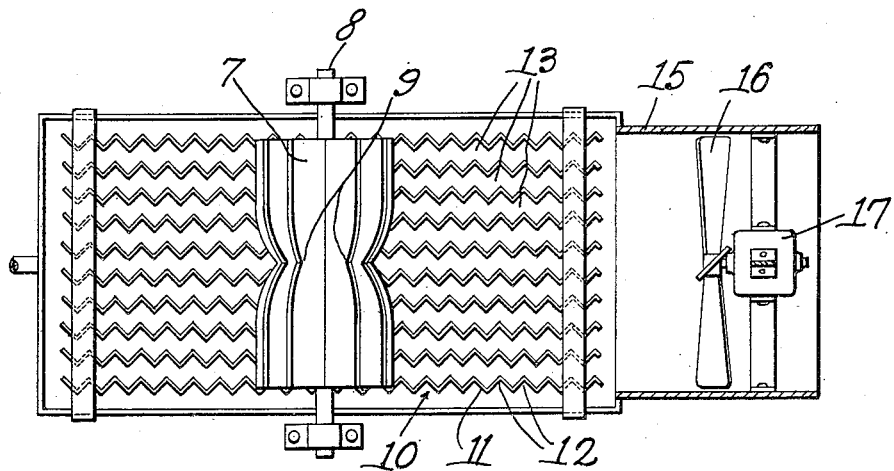
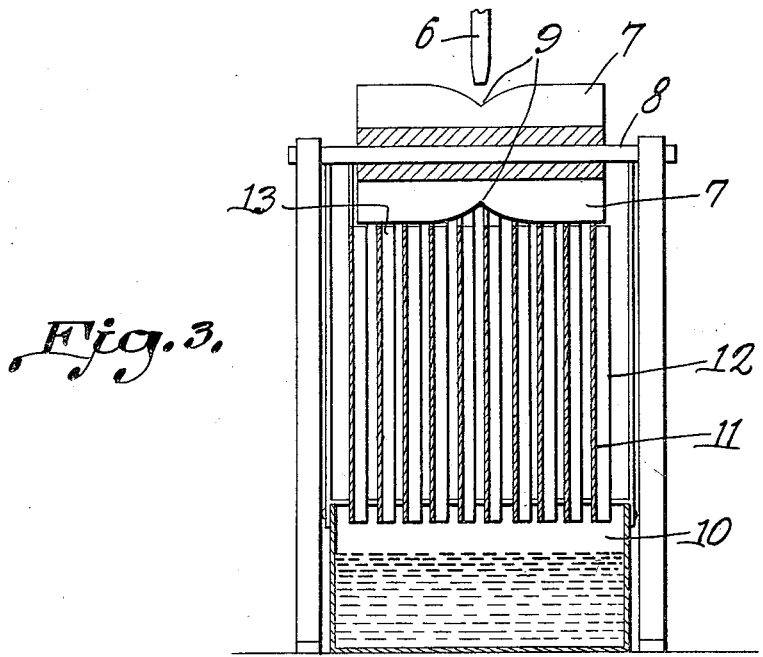

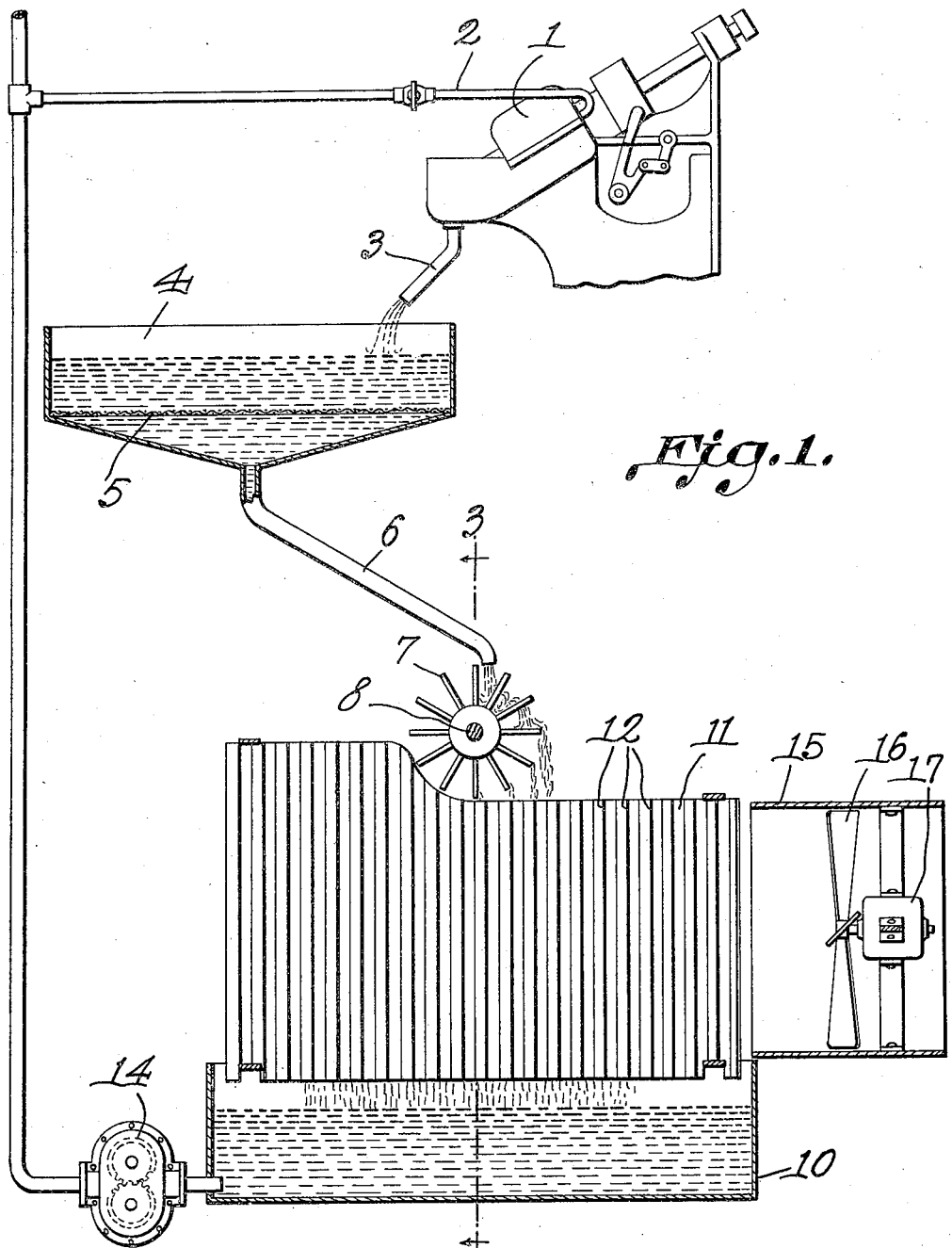

Patented Apr. 18, 1933

1,904,412

UNITED STATES PATENT OFFICE

WILLIAM L. CLOUSE, OF TIFFIN, OHIO, ASSIGNOR TO THE NATIONAL MACHINERY COMPANY, OF TIFFIN, OHIO

LUBRICANT COOLER

Application filed November 10, 1930. Serial No. 494,788.

This invention relates to a cooler for use primarily in connection with machines for threading nuts and the like, although it can obviously be combined with other types of metal working machines requiring constant lubrication of the work and the tools acting thereon.

It is the present practice to direct a stream of lubricant onto the work being cut and as the lubricant is supplied to the machine in large quantities it is allowed to drain into a receptacle from which it is withdrawn and repeatedly used.

After a few hours of use the lubricant becomes excessively warm due to the heat absorbed from the cut metal, the tools and the cuttings, and the efficiency of the machine is correspondingly reduced. Frequently it has been necessary to stop the machine until the lubricant could cool or else some cooling medium has been placed in the heated lubricant, all of which has interrupted the operation of the machine and increased the cost of production.

It is an object of the present invention to combine with the tapping machine or the like a mechanism for acting on the lubricant as it flows from the work so as to remove the heat units absorbed from the tools, cuttings, etc. and maintain the lubricant at proper temperature for immediate reuse.

A further object is to provide a cooling mechanism the operation of which will not be hampered by any solids or other substances mixed with the lubricant being treated.

Another object is to spread the lubricant in a novel manner during the initial stage of the cooling operation without the use of spraying nozzles or other structures likely to become clogged.

With the foregoing and other objects in view which will appear as the description proceeds, the invention resides in the combination and arrangement of parts and in the details of construction hereinafter described and claimed, it being understood that changes in the precise embodiment of the invention may be made within the scope of what is claimed without departing from the spirit of the invention.

In the accompanying drawings the preferred form of the invention has been shown.

In said drawings

Figure 1 is a view more or less in diagram showing the cooling apparatus combined with a nut-tapping machine.

Figure 2 is a view partly in plan and partly in section of the cooling apparatus.

Figure 3 is a section on line 3—3, Figure 1.

Referring to the figures by characters of reference, 1 designates a portion of a machine for tapping nuts or for other operations on metal resulting in the production of heat by friction.

A nozzle 2 is used for directing a stream of lubricant into the machine and upon the work and the tools acting thereon. The lubricant flows from the machine through an outlet spout 3 into a pan 4 which can be provided with a filtering screen 5.

A nozzle or spout 6 extends from the pan so that lubricant will gravitate onto the blades of a distributor of special construction. The distributor consists of a series of elongated blades suitably connected to a shaft 8 and disposed radially thereof. The distributor is of any length desired and each of its blades is provided with a central recess 9 in its free longitudinal or pouring edge, said edge being curved outwardly from the recess towards the ends of the blade.

The spout 6 is arranged to deliver fluid above the center of the distributor slightly in advance of the vertical plane of the axis of rotation thereof. Thus the stream of lubricant, in falling on the blades, will cause the distributor to rotate like an overshot water wheel and as each blade moves downwardly under the force of the fluid, said fluid will flow over the edge of the blade and be spread gradually from the recess 9 toward the two ends of the blade. The edges of the blades can be so shaped as to insure substantially a uniform distribution of fluid over the entire length of the distributor so that it will fall in a thin broad stream.

Located beneath the distributor is a pan 10 and interposed between the pan and distributor are upstanding cooling plates 11 formed with upwardly extended corrugations 12. These plates provide narrow but deep flues 13 between them which open downwardly into the pan 10 and extend upwardly close to the distributor.

A pump 14 is connected to the pan 10 and operates to withdraw fluid therefrom and to elevate it to the nozzle 2.

At one end of the flues 13 is a housing 15 in which is located a fan 16 adapted to be driven by any suitable means. In the drawings an electric motor 17 is used for this purpose, but obviously the fan can be geared to the mechanism of the tapping machine if so desired.

In practice the pan 10 is provided with a supply of lubricant and when pump 14 is operated a continuous stream of lubricant is elevated to nozzle 2 and delivered into the mechanism 1. Here it will not only lubricate the work and the tools acting thereon, but will also absorb heat generated by friction. The used lubricant will be discharged from spout 3 to pan 4 where large solids will be separated therefrom. The lubricant will then be directed onto the distributor which will be rotated by the impact thereof and at the same time spread the fluid over the edges of blades 7 so that it will be dropped onto the several cooling plates 11 and into the flues therebetween. Here it will be met by air currents rushing to the fan 16, and as a result the heat absorbed by the lubricant while in the machine 1 will be carried off and the lubricant can be reused time and again without danger of becoming too warm.

The apparatus described is advantageous, because it can handle efficiently lubricant flowing in a large stream through the machine, and because there are no parts likely to become clogged by solids.

What is claimed is:

1. An apparatus of the class described including a receiver for lubricant, spaced cooling plates upstanding thereabove, means for directing air currents between the plates, means for distributing lubricant over the plates and downwardly across and in direct contact with the air currents in the spaces between the plates, and means, including mechanism to be lubricated, for elevating lubricant from the receiver and directing it onto the distributing means.

2. An apparatus of the class described including a receiver for lubricant, spaced cooling plates upstanding thereabove, means for air cooling the plates, means for elevating lubricant from the receiver, and a distributor adapted to be actuated by the elevated lubricant, said receiver including a rotatable series of radial blades extending transversely over the cooling plates, each blade having a pouring edge extending from end to end thereof provided with a recess.

3. Apparatus of the class described including a lubricant receiver, spaced corrugated cooling plates extending upwardly thereabove, means for air cooling the plates and setting up air currents between the plates, a distributor mounted for free rotation above and transversely of the plates, and means for elevating lubricant from the receiver and directing it onto the distributor to rotate the same and direct the lubricant onto and between the plates.

4. Apparatus of the class described including a lubricant receiver, spaced corrugated cooling plates extending upwardly thereabove, means for air cooling the plates and setting up air currents between the plates, a distributor mounted for free rotation above and transversely of the plates, and means for elevating lubricant from the receiver and directing it onto the distributor to rotate the same and direct the lubricant onto and between the plates.

In testimony that I claim the foregoing as my own, I have hereto affixed my signature.

WILLIAM L. CLOUSE.